No. 852,581. PATENTED MAY 7, 1907.
F. B. SANBORN.
NOZZLE PIEZOMETER.
APPLICATION FILED SEPT. 28, 1905.
2 SHEETS—SHEET 1.
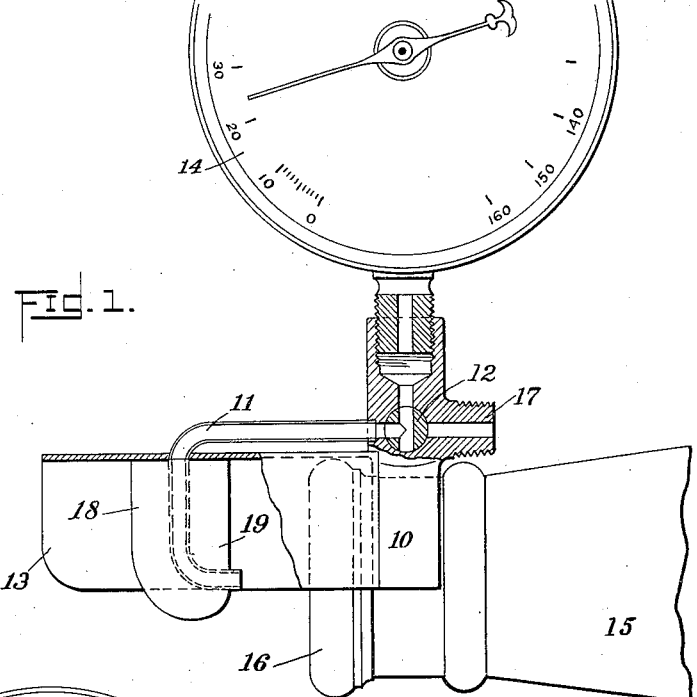
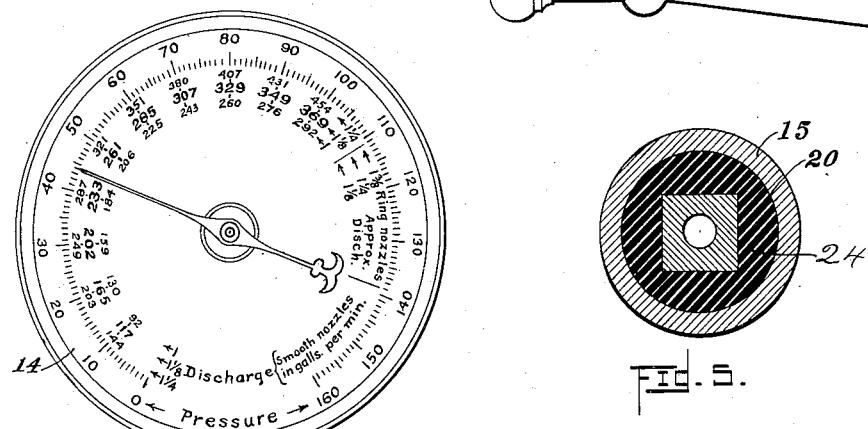
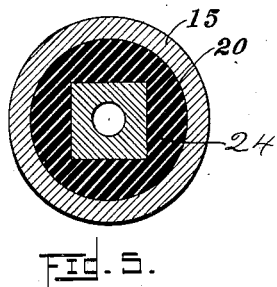
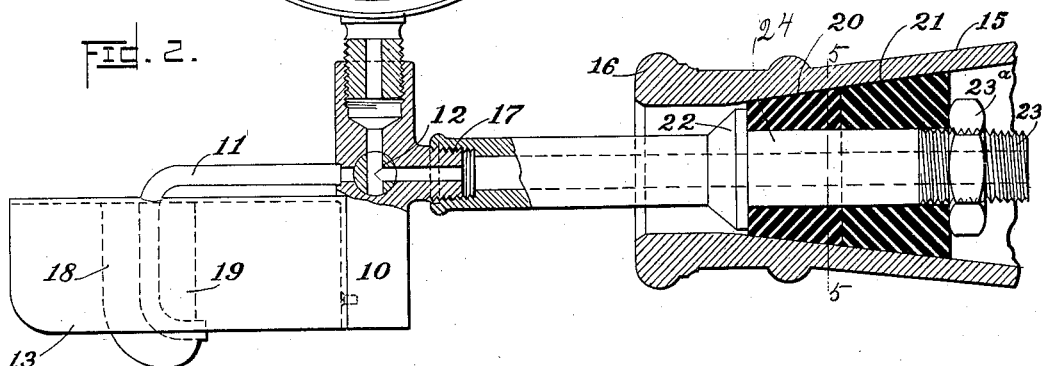
WITNESSES:
Carl L. Svensen
Van E. Jerauld
INVENTOR:
Frank B. Sanborn No. 852,581. PATENTED MAY 7, 1907.
F. B. SANBORN.
NOZZLE PIEZOMETER.
APPLICATION FILED SEPT. 28, 1905.

2 SHEETS—SHEET 2.

WITNESSES: INVENTOR:
Carl L. Svensen Frank B. Sanborn

UNITED STATES PATENT OFFICE.

FRANK B. SANBORN, OF CAMBRIDGE, MASSACHUSETTS.

NOZZLE-PIEZOMETER.

No. 852,581. Specification of Letters Patent. Patented May 7, 1907.

Application filed September 28, 1905. Serial No. 280,543.

*To all whom it may concern:*

Be it known that I, FRANK B. SANBORN, a citizen of the United States, and a resident of Cambridge, in the county of Middlesex and State of Massachusetts, have invented a new and Improved Nozzle-Piezometer, of which the following is a specification.

My invention relates to devices for determining fluid pressures and more particularly the pressure of water or force of streams flowing from nozzles, and the static pressure existing in pipes. Its principal objects are to provide a device that will be light enough to be carried conveniently in the pocket, of simple design so that it can be quickly applied to a flowing stream and, with a pressure gage or indicating means attached, show the full available pressure afforded by the flowing stream, and also show the quantity of water thus being delivered. Furthermore the application of the device to the flowing stream should easily be accomplished even by one unskilled and even without liability of getting wet by the broken streams of water or other fluid. An additional object of the invention is to afford a convenient means of determining the static pressure at any hydrant or the like. These objects are attained by the apparatus represented in the following drawings and hereafter described.

Figure 3:
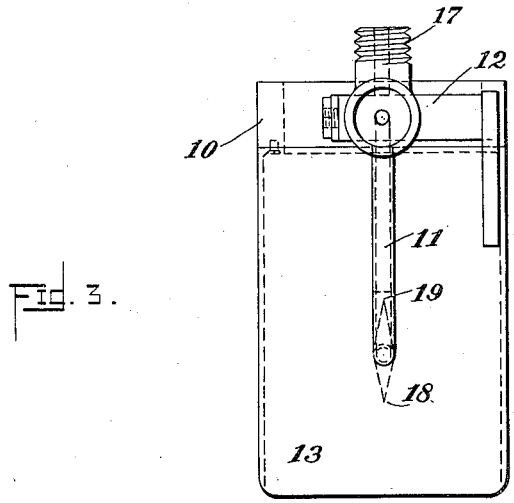
Figure 4:
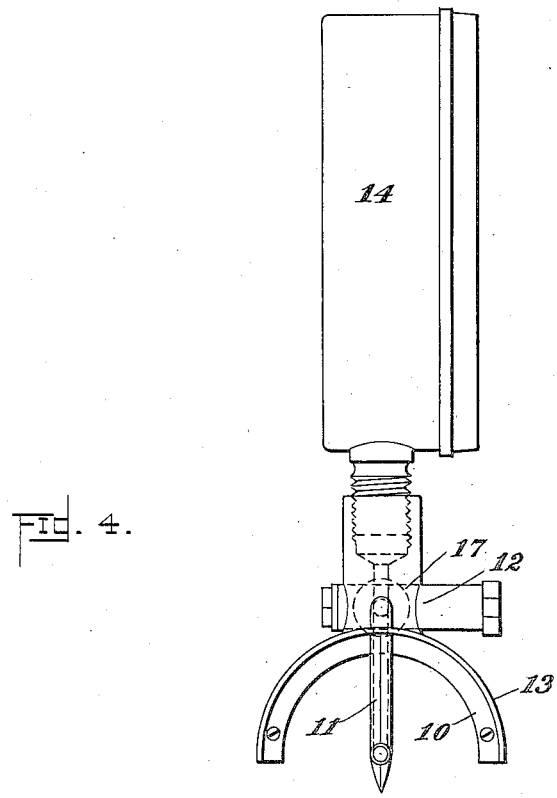

Figure 1 is a longitudinal sectional elevation of one embodiment of my invention applied with a pressure gage or indicating means to a nozzle for measuring dynamic pressure. Fig. 2 is a longitudinal sectional elevation of another embodiment of my invention applied to a nozzle for measuring static pressure. Fig. 3 is a top plan view of the device illustrated in Fig. 1 with the gage removed. Fig. 4 is an end elevation looking from the left-hand face of Fig. 1, the nozzle being omitted. Fig. 5 is a transverse sectional detail on the line 5 5 of Fig. 2.

The body portion or supporting member 10 of the device is shown in Figs. 1 and 2. Associated with this body portion is the bent tube 11, the three-way cock 12, the shield 13, and the gage or indicating means 14. The body portion serves as a support for the gage and for the weight that may be superimposed. Also it serves to form a shoulder which is placed in contact with the bead 16 of the nozzle and this contact together with a slight pressure from the hand keeps the piezometer in place and helps to keep the proper alinement. The bent tube 11 has the form approximately as shown in Figs. 1 and 2. The water from the nozzle 15 enters this tube and transmits the desired pressure to the pressure gage or indicating means 14. At 12 is a three-way cock which permits (1) the passage from tube to gage to be open, or (2) the passage from tube to connection 17 to be open, or (3) the passage from connection 17 to pressure gage to be open.

The curved shield 13 by its contact with the bead 16 and the stream issuing from the nozzle resists movement to one side or another. This shield also prevents water from issuing upward or backward. Similarly to keep alinement and prevent splashing are the knife, edges or dividers 18 and 19. The thickness of these knife-edges or dividers increases from the edges 18 and 19 to the full size of the bent tube. Thus it gives a smooth passage for the water as it comes on at 19 and flows off at 18.

The gage or indicating means 14, has special graduations, which permits both the pressures and the quantity of discharge to be indicated. There are four concentric rows of figures on the dial face; one row represents pressures, and the other three rows represent the discharges by different sizes of nozzles for corresponding pressures obtained by applying the nozzle piezometer to one of the sizes of nozzles represented.

17 is a connection with outside thread for the apparatus shown in Fig. 2. In this position the apparatus is in use for testing static pressure. Rubber or yieldable bushings 20 and 21—one or both being used according to the size of nozzle that is available—taper gradually to conform to the bore of the nozzle, and they fit closely on a metal pipe. Back of these rubber or yieldable bushings is nut 23ª which coöperates with the thread 23 and prevents the pipe from being displaced by the pressure of the fluid as it enters the nozzle, and forces through the three-way cock which is set as shown in Fig. 2 so that the fluid pressure acts upon the gage which thus indicates the true static pressure.

22 is a shoulder which acts when the apparatus needs to be driven out of the nozzle after a test is finished.

23 is a taper-threaded connection usually with ⅛- or ¼-inch pipe thread which enables the apparatus to be applied to a hole fitted with a corresponding thread as for instance in a hydrant. Pressure is thus obtained without the use of a nozzle.

In order conveniently to screw the apparatus into place and unscrew it after a test is completed the hole through the bushings and portion 24 are made with square or angular cross-section, thus permitting the bushings to be gripped with the hand and the whole turned without the aid of a wrench.

Thus it is seen that the whole apparatus serves (1) to obtain quickly the effective pressure of fluids flowing through a nozzle, (2) likewise even the quantity of discharge for certain sizes of nozzles, (3) the static pressure of fluids by inserting a portion of the device in a nozzle, or (4) the static pressure by application to a tapped hole.

Having thus described my invention, I claim as new and desire to secure by Letters Patent:—

1. A testing apparatus for use in connection with a fluid-discharge device comprising indicating means, and portions applicable to the discharge device and having passages leading to the indicating means, said passages being maintained in different relations to the discharge device according to which one of the portions of the apparatus is applied to the discharge device whereby fluid pressures of different characters may be measured.

2. A testing apparatus for use in connection with a fluid-discharge device comprising indicating means, a body portion having passages leading to the indicating means, means for holding the body portion with the inlet-opening of one passage within the discharge device, and means for positioning said body portion with the inlet-opening of another passage opposite the open end of the discharge device.

3. A testing apparatus for use in connection with a fluid-discharge device comprising indicating means, a body portion having passages leading to the indicating means, means for confining the fluid at the discharge device to one passage, and means for positioning the body portion with the inlet-opening of a passage opposite the open end of the discharge device.

4. A testing apparatus for use in connection with the discharge-nozzles or the like comprising indicating means to which lead a plurality of passages, means associated with one passage for closing the nozzle to direct fluid pressure into said passage, and means for fixing the relation of the opening of another passage with respect to the nozzle.

5. A testing device for use in connection with discharge nozzles or the like comprising indicating means having a passage leading thereto, means for positioning the inlet-opening of the passage at a point removed from the nozzle, whereby free fluid flow from said nozzle is permitted, and a shield extending over both the extremity of the nozzle and the inlet-opening of the passage.

6. A testing apparatus for use in connection with discharge-nozzles or the like comprising indicating means having a passage leading thereto, means for fixing the relation of the inlet-opening of the passage to the open end of the nozzle, and a shield extending over both the extremity of the nozzle and the inlet-opening of the passage and being curved over the stream issuing from the nozzle.

7. A testing apparatus for use in connection with discharge-nozzles or the like comprising indicating means having a passage leading thereto, means for fixing the relation of the inlet-opening of the passage to the open end of the nozzle, and a divider situated adjacent to the inlet-opening of the passage and having a reduced edge turned toward the nozzle.

8. A testing apparatus comprising a body portion, a tube extending outwardly from, and then back toward said body portion, and a gage connected with the tube through the body portion.

9. A testing apparatus comprising a body portion adapted to engage the exterior of a nozzle, a tube extending outwardly from said body portion, and having an enlargement adapted to be received by and to close the interior of said nozzle and a gage connected with the tube through the body portion.

10. A testing apparatus comprising a body portion, a tube extending outwardly from said body portion, a sectional bushing of yieldable material surrounding the tube, and a gage connected with the tube through the body portion.

11. A testing apparatus comprising a body portion, a tube extending outwardly from said body portion, a sectional bushing of yieldable material surrounding the tube, means for preventing the rotation of the bushing on the tube, and a gage connected with the tube through the body portion.

12. A portable testing apparatus comprising a body provided with an indicator-passage and separate inlet-passages communicating with the indicator-passage, a valve operable in the body for independently connecting either inlet-passage with the indicator-passage, means for applying static fluid pressure to one of the inlet-passages, and means for applying dynamic fluid pressure to another inlet-passage.

13. A portable testing apparatus comprising a body provided with an indicator-passage and separate inlet-passages communicating with the indicator-passage, means for applying static fluid pressure to one of the inlet-passages, means for applying dynamic fluid pressure to another inlet-passage, and a shield extending from the body over the dynamic-pressure-applying means.

14. A portable testing apparatus comprising a body provided with an indicator-passage and separate inlet-passages communicating with the indicator-passage, means for applying the static fluid pressure to one of the inlet-passages means for applying dynamic fluid pressure to another inlet-passage, and a shield extending from the body over the dynamic pressure applying means and at the side toward the indicator-passage.

15. A portable testing apparatus comprising a body provided with an indicator-passage and an inlet-passage and having a supporting-portion adapted to engage a nozzle, and a conduit leading from the inlet-passage and opening toward the supporting-portion.

16. A testing apparatus for use in connection with a fluid-discharge device comprising portions applicable to the discharge device and having passages maintained in different relations to said device by the contact of the apparatus therewith, and a gage to which the passages lead and which is provided with a plurality of scales including one indicating fluid pressure and one indicating the quantity of fluid discharged.

17. A portable testing apparatus comprising a body provided with an indicator-passage and an inlet-passage and having a supporting-portion adapted to engage a nozzle, a conduit leading from the inlet-passage and opening toward the supporting-portion, and a shield extending over the conduit-opening.

18. A portable testing apparatus comprising a body provided with an indicator-passage and an inlet-passage and having a curved supporting-portion, a conduit leading from the inlet-passage and opening toward said supporting-portion, and a shield extending from and generally conforming to the curve of the supporting-portion and projecting over the conduit-opening.

19. A portable testing apparatus comprising a body provided with an indicator-passage and an inlet-passage and having a supporting-portion, a conduit leading from the inlet-passage, and a divider situated adjacent to the conduit and having a reduced edge extending toward the supporting-portion.

20. A portable testing apparatus comprising a body provided with an indicator-passage and an inlet-passage and having a supporting-portion, a conduit leading from the inlet-passage, and a divider extending upon opposite sides of the conduit and having its outer edges reduced, one of said edges being upon the side toward the supporting-portion.

Signed by me at Boston, Massachusetts, this 21st day of September, 1905.

FRANK B. SANBORN.

Witnesses:
C. H. PHINNEY,
GARDNER C. ANTHONY.